(12) United States Patent
Connor et al.

(10) Patent No.: US 7,299,350 B2
(45) Date of Patent: Nov. 20, 2007

(54) INTERNET PROTOCOL SECURITY DECRYPTION WITH SECONDARY USE SPECULATIVE INTERRUPTS

(75) Inventors: Patrick L Connor, Portland, OR (US); Linden Minnick, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 691 days.

(21) Appl. No.: 10/051,668

(22) Filed: Jan. 17, 2002

(65) Prior Publication Data

US 2003/0135757 A1 Jul. 17, 2003

(51) Int. Cl.
*H04L 9/00* (2006.01)

(52) U.S. Cl. .............. 713/151; 713/153; 713/189; 713/160; 710/260

(58) Field of Classification Search ........ 713/150–154, 713/200, 162, 189, 160; 710/260–264, 22, 710/25; 709/230, 250, 224, 220, 227; 370/469; 712/220, 221; 726/11, 12, 14, 2, 3; 380/255, 380/260, 37, 42

See application file for complete search history.

(56) References Cited

U.S. PATENT DOCUMENTS

| | | | | |
|---|---|---|---|---|
| 5,412,782 A | * | 5/1995 | Hausman et al. | 709/250 |
| 5,802,153 A | * | 9/1998 | Sridhar et al. | 375/220 |
| 5,905,874 A | * | 5/1999 | Johnson | 709/250 |
| 6,016,513 A | * | 1/2000 | Lowe | 709/250 |
| 6,112,252 A | * | 8/2000 | Hausman et al. | 709/250 |
| 6,148,082 A | * | 11/2000 | Slattery et al. | 380/212 |
| 6,243,787 B1 | * | 6/2001 | Kagan et al. | 710/263 |
| 6,304,911 B1 | * | 10/2001 | Brcich et al. | 709/237 |
| 6,385,727 B1 | * | 5/2002 | Cassagnol et al. | 713/193 |
| 6,715,005 B1 | * | 3/2004 | Rodriguez et al. | 710/41 |
| 6,718,413 B1 | * | 4/2004 | Wilson et al. | 710/260 |
| 6,754,755 B1 | * | 6/2004 | Johnson et al. | 710/262 |

FOREIGN PATENT DOCUMENTS

WO    WO 01/05086 A2 *  7/2000

* cited by examiner

*Primary Examiner*—Kim Vu
*Assistant Examiner*—Nirav Patel
(74) *Attorney, Agent, or Firm*—Pillsbury Winthrop Shaw Pittman LLP

(57) ABSTRACT

A system for improved decryption performance includes a computer in electronic communication with an encrypted network. A controller performs a decryption operation on an encrypted packet received from the network, and the computer asserts an interrupt prior to the system completing transfer of the decrypted packet back to host memory to reduce the additional latency a packet suffers during Secondary Use. An additional interrupt may be asserted after the Secondary Use operation is complete, to ensure that the Secondary Use packet is processed. A method for improving decryption performance similarly includes asserting an interrupt prior to the complete transfer of a decrypted packet from a controller back to host memory during Secondary Use. The method may further include asserting an additional interrupt after the Secondary Use operation is complete, to ensure that the Secondary Use packet is processed.

13 Claims, 4 Drawing Sheets

INTERNET PROTOCOL SECURITY DECRYPTION WITH SECONDARY USE SPECULATIVE INTERRUPTS

BACKGROUND OF THE INVENTION

1. Field of the Invention

The present invention generally relates to encrypted networks. More particularly, the present invention relates to a system and method for improving the performance of an encrypted network by asserting interrupts to reduce latency that packets suffer during Secondary Use.

2. Discussion of the Related Art

Internet Protocol Security ("IPSec") is employed to protect both the confidentiality and integrity of data that is transferred on a network. Because IPSec provides a way to encrypt and decrypt data below the transport layer (e.g., Transmission Control Protocol, "TCP" or User Datagram Protocol, "UDP"), the protection is transparent to applications that transfer data. Thus, no alterations are required at the application level in order to utilize IPSec. However, when implemented in software, the algorithms used for encryption, decryption, and authentication of the data for IPSec require execution of numerous CPU cycles. Because many CPU cycles must be delegated to such cryptography operations, there are correspondingly fewer CPU cycles available to applications and other parts of the protocol stack. This configuration adds latency to received data reaching the application, thereby decreasing the throughput of the system.

One current solution to this problem is to offload the cryptography operations to an external piece of hardware, such as a Network Interface Card ("NIC"). Generally, the most efficient way to offload such operations is to encrypt the data immediately before transmitting a packet, and to decrypt the data directly off the network before the packet is direct memory access ("DMA") transferred to host memory. This process of decrypting and authenticating ingress data before it is transferred to host memory is known as "Inline Receive."

An alternative to Inline Receive is the "Secondary Use" model. In this latter model, received packets are DMA transferred into host memory. The network driver then parses each packet to match it with its corresponding Security Association ("SA"), which is a data structure that contains all information necessary to encrypt, decrypt and/or authenticate a packet. Where a cryptography accelerator is included, the driver instructs the NIC to transfer the packet across the bus to the controller, perform the cryptography operation on the packet, and then transfer the packet back to host memory. The packet is thus transferred across the bus three times: (1) upon receipt from the network through the NIC across the bus and into host memory; (2) upon transfer from the host memory across the bus to the controller; and (3) upon transfer from the controller across the bus back to host memory.

An extra interrupt is often required to perform these transfers across the bus. However, such interrupts increase CPU utilization. Furthermore, the extra latency introduced can degrade throughput of protocols that are sensitive to the round trip time of packets, such as TCP.

From a performance perspective (both CPU utilization and throughput), Inline Receive is generally considered a better solution than Secondary Use. However, Inline Receive is more expensive to implement because the keys and matching information for cryptography operations must be stored on the network interface in an SA cache. Due to such limitations, the INTEL PRO/100 S Server Adapter, for example, supports only a limited number of connections that can use Inline Receive. Other connections use the Secondary Use model to offload secure traffic, though Secondary Use adds latency to packets at several steps. The primary source of the increased latency for Secondary Use is the delay related to the final interrupt of the Secondary Use operation.

Early ingress interrupts have been used on low speed buses where the transfer operation was expensive. The device typically transfers the header portion of the packet to host memory and then assert an interrupt. The header portion is used to determine if there was interest in transferring the rest of the packet to host memory. If not, the rest of the packet would be discarded. This scheme avoided burdening the bus with unnecessary data.

With the advent of busmasters in peripheral component interconnect ("PCI"), this use of early interrupts for any traffic has become scarce. In fact, to accommodate the high packet rates of high-speed networks such as Gigabit Ethernet, most input/output ("I/O") controller devices offer interrupt coalescing features that delay interrupt assertions to allow several interrupt events to be processed in one occurrence of the interrupt handler. When Secondary Use is utilized extensively, sending packets across the PCI bus three times reduces the bus bandwidth available. This utilization, in turn, reduces the packet rate that can be processed, further reducing or eliminating the utility of the interrupt coalescing algorithms.

Accordingly, there is a need for a system and method of improving the performance of an encrypted network by asserting interrupts to reduce latency that packets suffer during Secondary Use.

DETAILED DESCRIPTION

Figure 1:
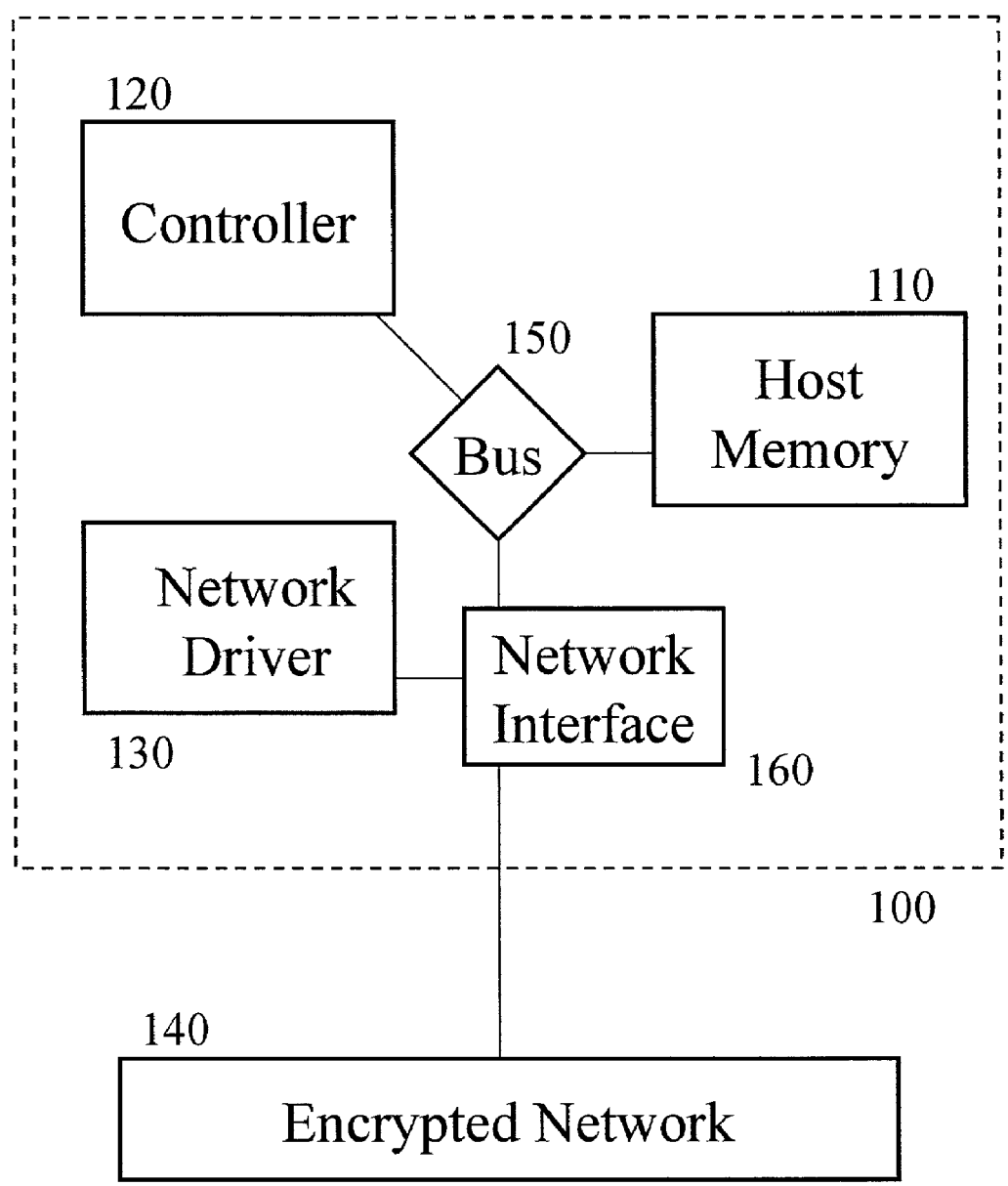
FIG. 1 illustrates a block diagram of an encrypted network system in accordance with an embodiment of the present invention.

The present invention provides systems and methods for reducing the latency of the final interrupt of a Secondary Use process. This scheme is preferably accomplished by signaling the "Secondary Use complete" interrupt before the Secondary Use operation is fully complete, thereby allowing the associated Interrupt Handler Latency to overlap with the completion of the Secondary Use operation itself As depicted in FIG. 1, a preferred encrypted network system of the present invention may include a computing system 100 with a network driver 130, a controller 120, a network interface 160 with a cryptography accelerator, a bus 150, and host memory 110 with at least one SA stored thereupon, and may further be connected to an encrypted network 140. The network interface 160 is preferably a NIC, a component on the motherboard, or in the chip set itself. The computing system 100 is preferably a computer, and may receive an encrypted packet from the encrypted network 140. Upon receipt of this packet, the computing system 100 may DMA transfer the packet through the network interface 160 and across the bus 150 to host memory 110.

The network driver 130 may then parse the packet, match the packet with a corresponding SA, and instruct the network interface 160 to transfer the packet and corresponding SA across the bus 150 to the controller 120 for decryption. The controller 120 may then decrypt and authenticate the packet, whereupon the decrypted packet is transferred back across the bus 150 to host memory 110. The packet is thus transferred across the bus 150 three times.

Figure 2:
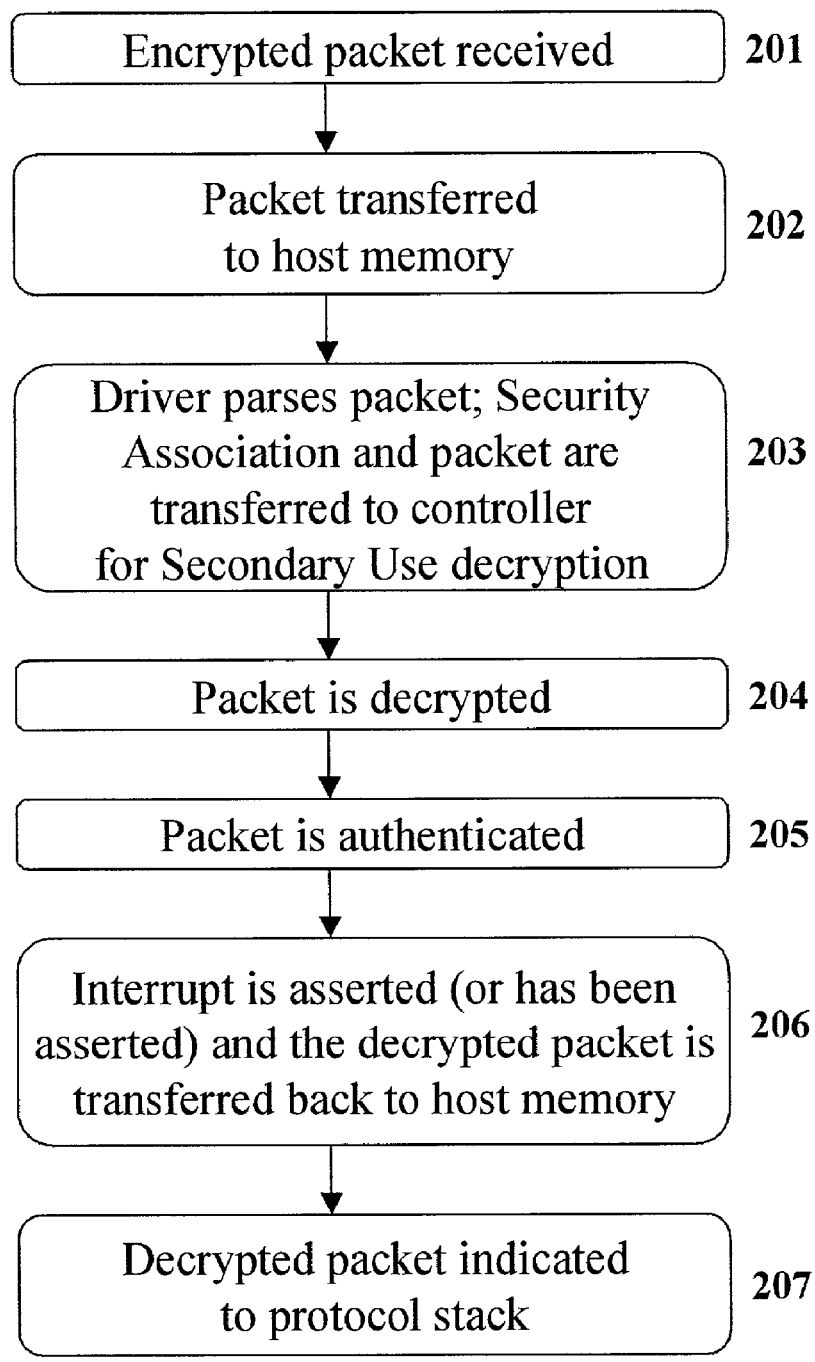
FIG. 2 illustrates critical path events in accordance with an embodiment of the present invention.

This configuration is further illustrated in FIG. 2, which indicates the critical path events of the aforementioned system. In a preferred embodiment of the present invention, an encrypted packet is received 201 and DMA transferred 202 to host memory. The driver may then parse the packet, match the packet with a corresponding SA, and instruct the network interface to transfer the packet and corresponding SA to the controller for Secondary Use decryption 203. The packet may then be decrypted by the controller 204 and authenticated 205. Notably, to this point the Secondary Use operation of the present invention may be similar to a conventional Secondary Use operation, as depicted in FIG. 3 (i.e., critical path events 201-205 of the present invention may be similar to conventional critical path events 301-305).

Figure 3:
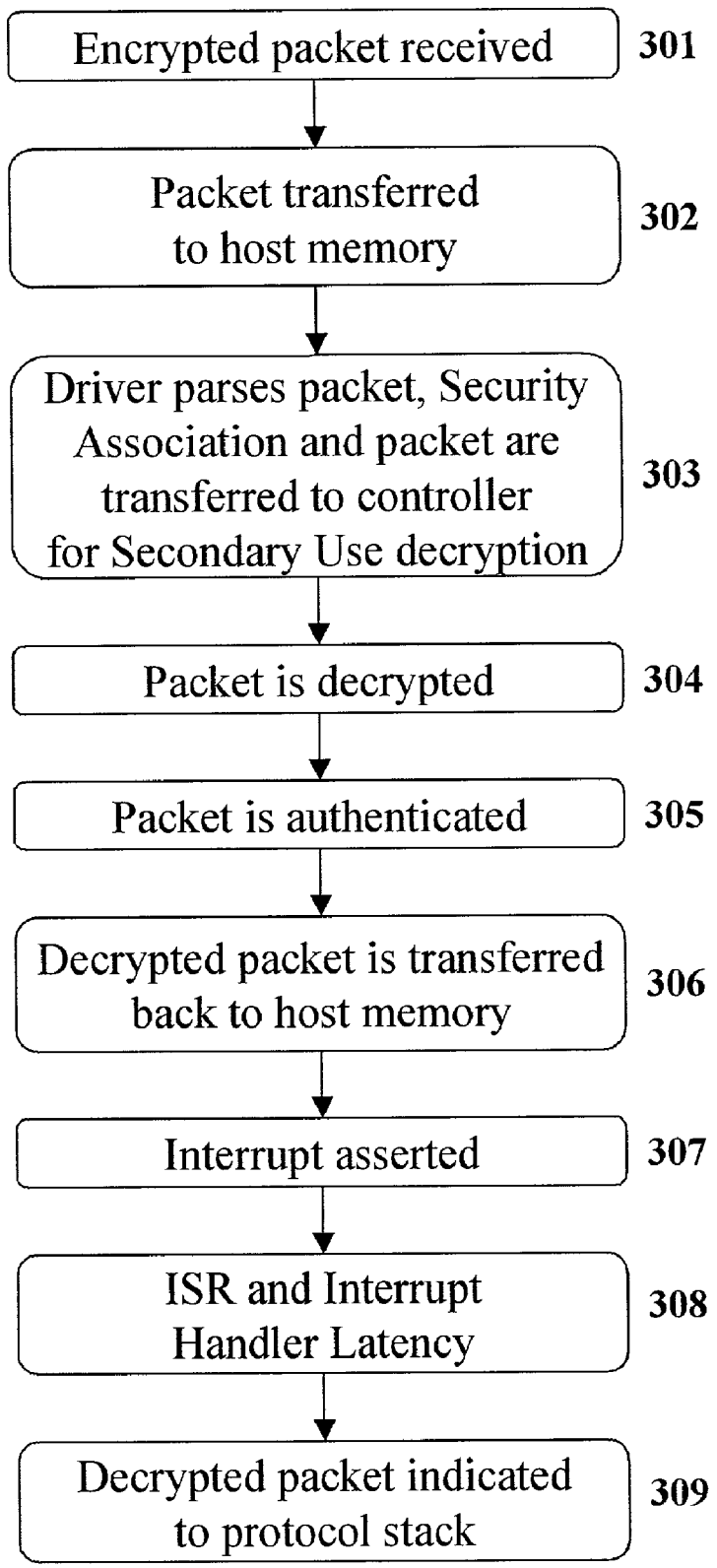
FIG. 3 illustrates critical path events in accordance with prior art, conventional Secondary Use decryption.

As depicted in FIG. 3, however, conventional Secondary Use operations include an Interrupt Handler Latency 308, because the Secondary Use interrupt is asserted 307 only after the decrypted packet is transferred back to host memory 306. However, as depicted in FIG. 2, Interrupt Handler Latency is either eliminated or substantially reduced in embodiments of the present invention because the interrupt is most preferably asserted prior to completing the transfer of the decrypted packet to host memory 206. Thus, in the present invention, the Interrupt Handler Latency most preferably occurs in parallel with the transfer of the packet 206. Both conventional Secondary Use operations and the Secondary Use operations of the present invention may then terminate with indicating the decrypted packet to a protocol stack (309 and 207, respectively).

The present invention further provides a method for improving the performance of a computing system in communication with an encrypted network. The method may include receiving an encrypted packet from a network and DMA transferring the packet to host memory. The packet may then be parsed, matched with a corresponding SA, and transferred along with the corresponding SA to a controller for decryption. The packet may next be decrypted, authenticated, and transferred back to host memory. An interrupt is preferably asserted prior to transfer of the decrypted packet back to host memory being complete.

Figure 4:
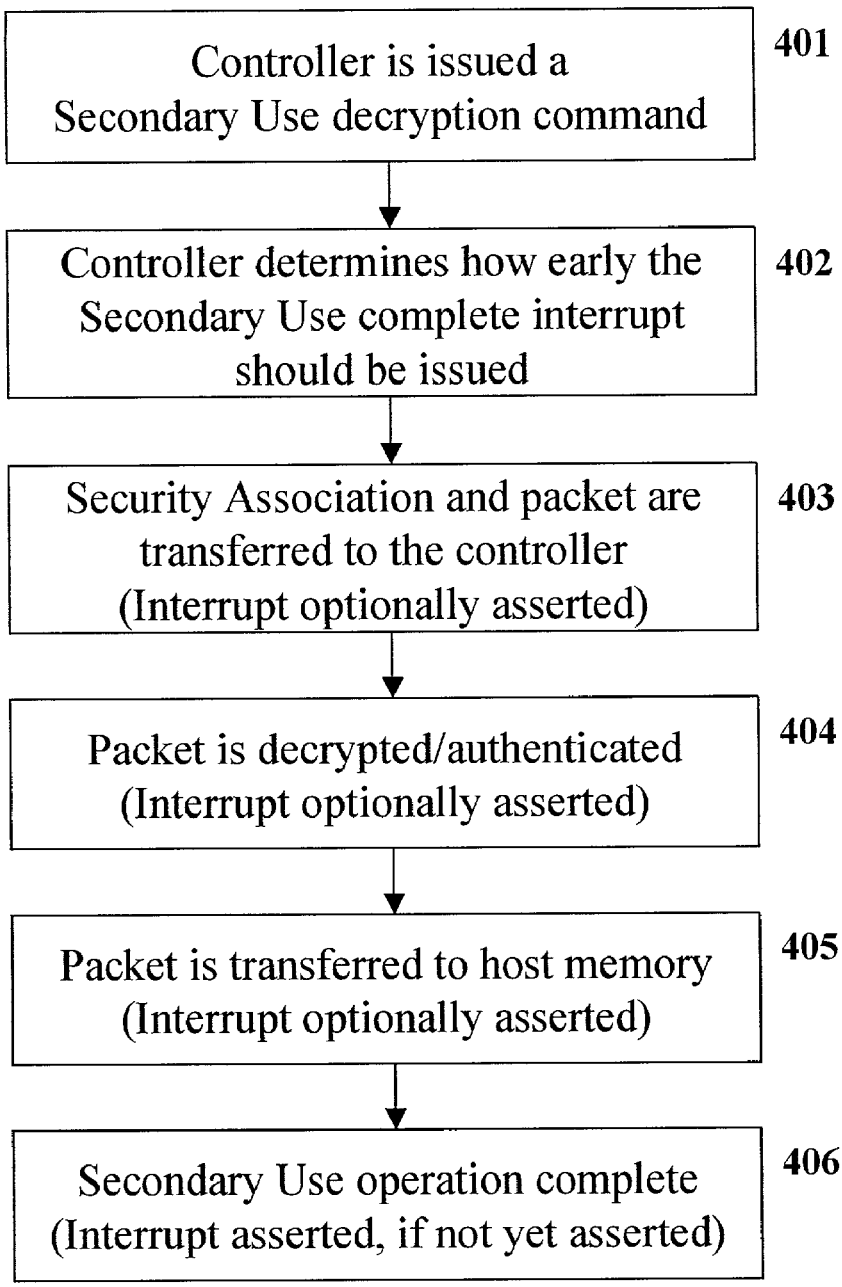
FIG. 4 illustrates a flow chart corresponding to an implementation of the logic according to an embodiment of the present invention.

Another method of the present invention reduces interrupt handler latency. As depicted in FIG. 4, the method may be a Secondary Use operation that includes first issuing a Secondary Use decryption command to a controller 401, such that the controller determines the appropriate time for issuance of a "Secondary Use complete" interrupt in response 402. An appropriate time is preferably any time between issuance of the Secondary Use decryption command and completion of transfer of the decrypted packet to host memory. The method may further include transferring a packet with corresponding SA to the controller 403. The controller may decrypt and authenticate the packet 404. The packet may then be transferred back to host memory 405, and the Secondary Use operation may then be complete 406. As indicated in FIG. 4, most preferably, the Secondary Use complete interrupt is issued at any point during operation 403-406, depending on the determination made by the controller 402.

To underscore the benefits of the present invention, Table 1 illustrates the latencies associated with various decryption methodologies.

TABLE 1

| | Total Latencies of Various Decryption Methodologies | | | |
|---|---|---|---|---|
| | Clear Traffic Path (no encryption) Time (μsec) | Inline Receive Path Time (μsec) | Conventional Secondary Use Time (μsec) | Secondary Use of Present Invention Time (μsec) |
| Receive Packet | 13 | 13 | 13 | 13 |
| Transfer to Host | 8 | — | 8 | 8 |
| Interrupt and Handler Latency | 40 | — | 40 | 40 |
| Parse Packet and Issue Secondary Use Command | — | — | 1 | 1 |
| Transfer Packet and SA to Controller | — | — | 8 | 8 |
| Decrypt Packet | — | 19 | 19 | 19 |
| Transfer Packet to Host | — | 8 | 8 | 8 |
| Interrupt Handler Latency | — | 40 | 40 | — |
| Indication | 4 | 4 | 4 | 4 |
| Total Latency | 65 | 84 | 141 | 101 |

Average Interrupt Handler Latency may be determined by the controller through the common "float and jump" adaptive algorithm, or other appropriate methodologies known in the art, as described in Example 1, below. Once calculated, this value may be used in embodiments of the present invention to determine when a Secondary Use complete interrupt should be asserted (i.e., how long before completing transfer of a decrypted packet back to host memory). In preferred embodiments of the present invention, the network driver specifies the Average Interrupt Handler Latency value as part of the Secondary Use decryption command. In this manner, the network driver is free to utilize any algorithm desired to best determine this value. For example, the Secondary Use command could indicate that the interrupt should be asserted after 1,000 bytes have been transferred to the controller (during step 403); after 600 bytes have been decrypted (during step 404); or after 200 bytes have been transferred back to host memory (during step 405). Referring again to FIG. 2 and FIG. 4, the Secondary Use complete interrupt is most preferably asserted during the intervals 203-206 and 403-406, respectively. In embodiments of the present invention where the Interrupt Handler Latency is relatively high and a relatively small amount of data is being decrypted, the completion interrupt may even be asserted before the data to be decrypted is completely on-chip and before the decryption operation begins.

Several of the stages in the preferred Secondary Use operations of the present invention do not have fixed time values. For example, the time that it takes to transfer a packet across a bus depends upon determinate values, such as the particular bus clock speed and width. It also depends upon bus availability, which can change depending on other devices in the system and their individual bus activity level. The Interrupt Handler Latency value itself is not fixed, however.

Given that there are multiple indeterminable factors, a race condition may be created in some embodiments of the present invention. Accordingly, in some instances, the interrupt handler operation could begin when the Secondary Use operation has not yet completed, such that the interrupt handler has no tasks to process. Therefore, in most preferred embodiments of the present invention, an additional interrupt is asserted after the Secondary Use operation is complete. This scheme ensures that the Secondary Use packet will be processed. If the Interrupt Handler is operating when this additional interrupt is asserted by the device, then this additional interrupt will not generate a system interrupt because the device interrupts are preferably disabled while the Interrupt Handler is operating. This means that in most instances, an additional interrupt will be masked and not increase the interrupt load on the system.

EXAMPLE 1

Determination of Average Interrupt Handler Latency

Decryption engines process data at a rate of approximately 600 Megabits per second ("Mbit/sec"). The latency from the device Interrupt Request line ("IRQ") to interrupt processing is based on measurements on INTEL PENTIUM III Processor and INTEL PENTIUM 4 Processor systems using a MICROSOFT WINDOWS 2000 Operating System. Notably, the value of this latency does not change significantly with processor speed.

The latency effect on TCP peak throughput is based on the bandwidth-delay product. Thus, maximum TCP throughput is the quotient of the receiver's window size divided by round trip time. The round trip time for a connection can be estimated from the latency values in Table 1; the latency values being doubled to account for the return of an acknowledgement. Assuming few or no infrastructure delays, and a 64K byte receiver's window (largest currently allowed without window scaling), the maximum throughput is estimated.

A single clear TCP connection generates about 500 Mbit of traffic at most. However, as more connections are added, the latencies suffered by each connection are increased. Correspondingly, throughput of an individual connection decreases while overall server throughput increases. It generally takes at least eight TCP connections to generate a gigabit of throughput.

Referring to the decryption methodologies outlined in Table 1, a single TCP connection using Inline Receive generates approximately 400 Mbit/sec; a conventional Secondary Use connection generates approximately 230 Mbit/sec; and the Secondary Use of the present invention generates approximately 320 Mbit/sec.

Thus, Inline Receive is generally a preferred method of decryption, since it allows the greatest throughput, but this decryption methodology cannot always be used due either to design choices or limited SA cache. However, the Secondary Use operation of the present invention performs significantly better than conventional Secondary Use methods.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein.

What is claimed is:

1. A computing system for performing a decryption operation on an encrypted packet, comprising:
    a network driver to regulate said decryption operation and to transmit a decryption command;
    a host memory to store the encrypted packet;
    a controller to receive the encrypted packet and to perform said decryption operation after receiving said decryption command from the network driver;
    a network interface to specify an interrupt handler latency value to the controller, said interrupt handler latency value being based on a specific number of bytes being decrypted in the controller;
    a bus providing electronic communication among said network driver, said host memory and said controller, said controller asserting an interrupt and after the specific number of bytes have been decrypted in the controller and before the decrypted packet is transferred back from the controller to the host memory.

2. A method of decrypting an encrypted packet received by a computing system, comprising:
    receiving said encrypted packet from a network and transferring said encrypted packet to a host memory;
    issuing a decryption command to a controller;
    specifying an interrupt handler latency value to the controller, the interrupt handler latency value being based on a specific number of bytes being decrypted in the controller;
    transferring said encrypted packet to said controller;
    converting said encrypted packet to a decrypted packet; and
    transferring said decrypted packet to the host memory, wherein an interrupt is asserted after the specific number of bytes have been decrypted in the controller and before the decrypted packet has been transferred from the controller to the host memory.

3. The method of claim 2, wherein the encrypted packet is transferred to the host memory via direct memory access (DMA).

4. The method of claim 2, further including a network driver to parse the encrypted packet at the network interface, match the encrypted packet with a corresponding security association, and to instruct that the corresponding security association is transferred to the controller with the encrypted packet.

5. A program code storage device, comprising:
   a machine-readable storage medium; and
   machine-readable program code, stored on the machine-readable storage medium, the machine-readable program code having instructions that when executed cause a computer system to;
   receive an encrypted packet from a network and transfer said encrypted packet to a host memory;
   issue a decryption command to a controller;
   specify an interrupt handler latency value to the controller, the interrupt handler latency value being based on a specific number of bytes being decrypted in the controller;
   transfer said encrypted packet to said controller;
   convert said encrypted packet to a decrypted packet; and
   transfer said decrypted packet to the host memory, wherein an interrupt is asserted after the specific number of bytes have been decrypted in the controller and before the decrypted packet has been transferred from the controller to the host memory.

6. The device of claim 5, wherein the encrypted packet is transferred to the host memory via direct memory access (DMA).

7. The device of claim 5, further including a network driver to parse the encrypted packet at the network interface, match the encrypted packet with a corresponding security association, and to instruct that the corresponding security association is transferred to the controller with the encrypted packet.

8. A method of decrypting an encrypted packet received by a network interface in a computing system, comprising:
   receiving said encrypted packet from a network and transferring said encrypted packet to a host memory;
   issuing a decryption command to a controller;
   specifying an interrupt handler latency value to the controller, the interrupt handler latency value being based on a specific number of bytes being decrypted in the controller; and
   transferring said encrypted packet to said controller which converts the encrypted packet to a decrypted packet and transfers the decrypted packet to the host memory, wherein an interrupt is asserted after a specific number of bytes have been decrypted in the controller and before the decrypted packets have been transferred from the controller to the host memory.

9. The method of claim 8, wherein the encrypted packet is transferred to the host memory via direct memory access (DMA).

10. The method of claim 8, further including a network driver to parse the encrypted packet at the network interface, match the encrypted packet with a corresponding security association, and to instruct that the corresponding security association is transferred to the controller with the encrypted packet.

11. A program code storage device, comprising:
    a machine-readable storage medium; and
    machine-readable program code, stored on the machine-readable storage medium, the machine-readable program code having instructions that when executed cause a network interface to:
    receive an encrypted packet from a network and transfer said encrypted packet to a host memory;
    issue a decryption command to a controller;
    specify an interrupt handler latency value to the controller, the interrupt handler latency value being based on a specific number of bytes being decrypted in the controller; and
    transfer said encrypted packet to said controller which converts the encrypted packet to a decrypted packet and transfers the decrypted packet to the host memory, wherein an interrupt is asserted after a specific number of bytes have been decrypted in the controller and before the decrypted packets have been transferred from the controller to the host memory.

12. The device of claim 11, wherein the encrypted packet is transferred to the host memory via direct memory access (DMA).

13. The device of claim 11, further including a network driver to parse the encrypted packet at the network interface, match the encrypted packet with a corresponding security association, and to instruct that the corresponding security association is transferred to the controller with the encrypted packet.

* * * * *